United States Patent
Johnson

(10) Patent No.: US 9,593,791 B2
(45) Date of Patent: Mar. 14, 2017

(54) PRESSURE WASHER COUPLER WITH 360 DEGREE ROTATION

(71) Applicant: Gene Johnson, Des Moines, IA (US)

(72) Inventor: Gene Johnson, Des Moines, IA (US)

(*) Notice: Subject to any disclaimer, the term of this patent is extended or adjusted under 35 U.S.C. 154(b) by 9 days.

(21) Appl. No.: 14/521,244

(22) Filed: Oct. 22, 2014

(65) Prior Publication Data

US 2015/0108751 A1    Apr. 23, 2015

Related U.S. Application Data

(60) Provisional application No. 61/894,084, filed on Oct. 22, 2013.

(51) Int. Cl.

| F16L 37/23 | (2006.01) |
|---|---|
| F16L 27/08 | (2006.01) |
| F16L 37/53 | (2006.01) |
| B08B 3/02 | (2006.01) |
| B05B 1/00 | (2006.01) |

(52) U.S. Cl.
CPC ........... *F16L 37/23* (2013.01); *B08B 3/026* (2013.01); *F16L 27/0828* (2013.01); *F16L 27/0841* (2013.01); *F16L 27/0849* (2013.01); *F16L 37/53* (2013.01); *B05B 1/00* (2013.01)

(58) Field of Classification Search
CPC ....... F16L 37/22; F16L 37/23; F16L 55/1133; F16L 27/023; F16L 27/02; F16L 27/0824; F16L 27/0849; F16L 27/0841; F16L 27/0828

See application file for complete search history.

(56) References Cited

U.S. PATENT DOCUMENTS

| 2,423,069 A | 6/1947 | McElhose et al. |
| 2,503,281 A | 4/1950 | Lynch et al. |
| 4,804,206 A | 2/1989 | Wood et al. |
| 4,946,204 A | 8/1990 | Boticki |
| 4,989,786 A | 2/1991 | Kranzle et al. |
| 5,115,836 A | 5/1992 | Carow et al. |
| 5,507,534 A | 4/1996 | Reifenberger et al. |
| 5,975,490 A * | 11/1999 | Essman .................. 251/149.4 |
| 6,412,829 B1 * | 7/2002 | Persson .................. 285/316 |
| 7,789,432 B2 | 9/2010 | Dohm et al. |
| 2003/0156893 A1 * | 8/2003 | Takagi ..................... 403/128 |

(Continued)

FOREIGN PATENT DOCUMENTS

KR    20100031269 A    3/2010

OTHER PUBLICATIONS

KR 2010-0031269A—Ju Ji Gi—English Abstract, published Mar. 22, 2010.

*Primary Examiner* — Daniel P Stodola
*Assistant Examiner* — Zachary Dragicevich
(74) *Attorney, Agent, or Firm* — McKee, Voorhees & Sease, PLC

(57) ABSTRACT

A pressure washer coupler is provided between the wand and spray nozzle of the pressure washer so that the angle of the spray can be selectively set. The coupler includes male and female quick connectors for the wand and the spray nozzle. A spring biased detent assembly allows one end of the coupler to be rotated 360° relative to the other end of the coupler, with the detent assembly maintaining the ends in a selected position. Thus, the spray can be directed parallel or perpendicular to the wand axis, and to numerous orientations therebetween.

7 Claims, 3 Drawing Sheets

(56) References Cited

U.S. PATENT DOCUMENTS

| | | | |
|---|---|---|---|
| 2004/0041395 A1* | 3/2004 | Frost | 285/98 |
| 2005/0093295 A1 | 5/2005 | Byerly et al. | |
| 2007/0246258 A1* | 10/2007 | Magno | F16L 27/0841 174/651 |
| 2008/0315581 A1* | 12/2008 | White | B05B 15/065 285/308 |
| 2009/0140519 A1* | 6/2009 | Pavnaskar et al. | 285/308 |
| 2010/0127198 A1* | 5/2010 | Cozza | 251/149.1 |
| 2012/0056418 A1 | 3/2012 | Boudry et al. | |

\* cited by examiner

PRESSURE WASHER COUPLER WITH 360 DEGREE ROTATION

CROSS REFERENCE TO RELATED APPLICATIONS

This application claims priority under 35 U.S.C. §119 to provisional applications U.S. Ser. No. 61/894,084 filed Oct. 22, 2013, herein incorporated by reference in its entirety.

BACKGROUND OF THE INVENTION

Pressure washers include a nozzle for spraying water toward an object to be cleaned. The nozzle is typically connected to a wand or gun so that an operator can control the actuation and/or the position of the nozzle. However, in many instances it is difficult to get the nozzle in the best position for spraying the object to be cleaned. For example, it is often desirable to spray the under carriage of an automobile, truck or other road vehicle to remove salt or other chemicals used on the roads to melt snow and ice, since such chemicals tend to promote rust on the vehicles. In other uses, there is insufficient clearance so as to best position the spray nozzle for maximum cleaning benefit.

Therefore, there is a need for an improved pressure washer assembly to maximize usage in places that are otherwise difficult to reach.

Accordingly, a primary objective of the present invention is the provision of an adjustable coupler for a pressure washer which allows the spray nozzle to be better positioned for spray cleaning of an object.

Another objective of the present invention is the provision of a pressure washer coupler having one end connected to the pressure washer hose and the other end connected to the pressure washer nozzle, with the coupler having 360° of rotation.

Still another objective is the provision of an adjustable coupler for a pressure washer wherein the user can select the angle of the outlet to a plurality of positions.

Yet another objective of the present invention is the provision of an adjustable coupler for a pressure washer wherein one end of the coupler can be adjusted to different set positions relative to the other end.

A further objective of the present invention is the provision of an adjustable coupler for a pressure washer having at least one end which can be incrementally adjusted to a variety of set positions for spraying at various angles.

Another objective of the present invention is the provision of a coupler for a pressure washer which can be rotated at angled increments to angle the spray in a desired direction.

Yet another objective of the present invention is the provision of a pressure washer coupler having one end with a quick coupler for attachment to a spray wand, and the other end having a quick coupler for attachment of a spray nozzle.

A further objective of the present invention is the provision of a pressure washer coupler which allows for quick and easy rotation of the spray nozzle to different positions.

Another objective of the present invention is the provision of a pressure washer coupler which is economical to manufacture and durable in use.

These and other objectives will become apparent from the following description of the invention.

SUMMARY OF THE INVENTION

The adjustable coupler of the present invention is intended for use on a pressure washer having a wand connected to a water line or hose and a spray nozzle or tip. The coupler includes male and female quick connections which allow the coupler to be quickly and easily attached onto the pressure washer wand and to the spray nozzle. The coupler includes a detent assembly with a lockable swivel body which allows one end of the coupler to be rotated 360° to numerous set positions so that the spray angle of the pressure washer can be selected, as needed.

DETAILED DESCRIPTION OF THE PREFERRED EMBODIMENTS

Figure 1:
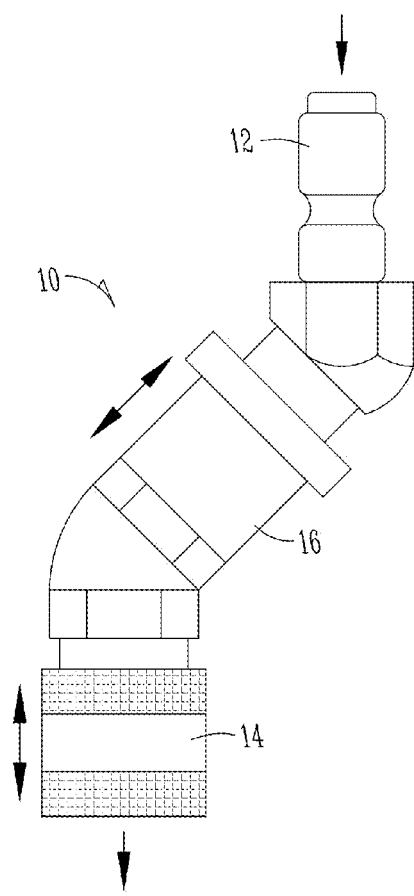
FIG. 1 is a side elevation view of the 360° swivel coupler for a pressure washer, according to the present invention, with the ends oriented for a spray line parallel to the pressure washer wand axis.
Figure 1A:
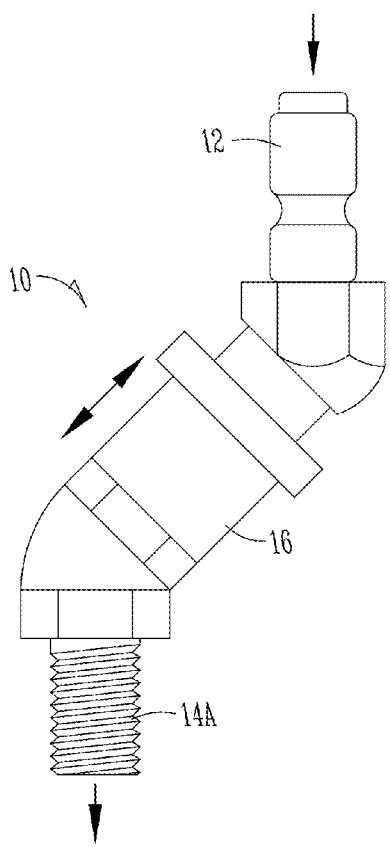
FIG. 1A is a side elevation view similar to FIG. 1 of a second embodiment of the 360° rotatable coupler for a pressure washer, according to the present invention.
Figure 2:
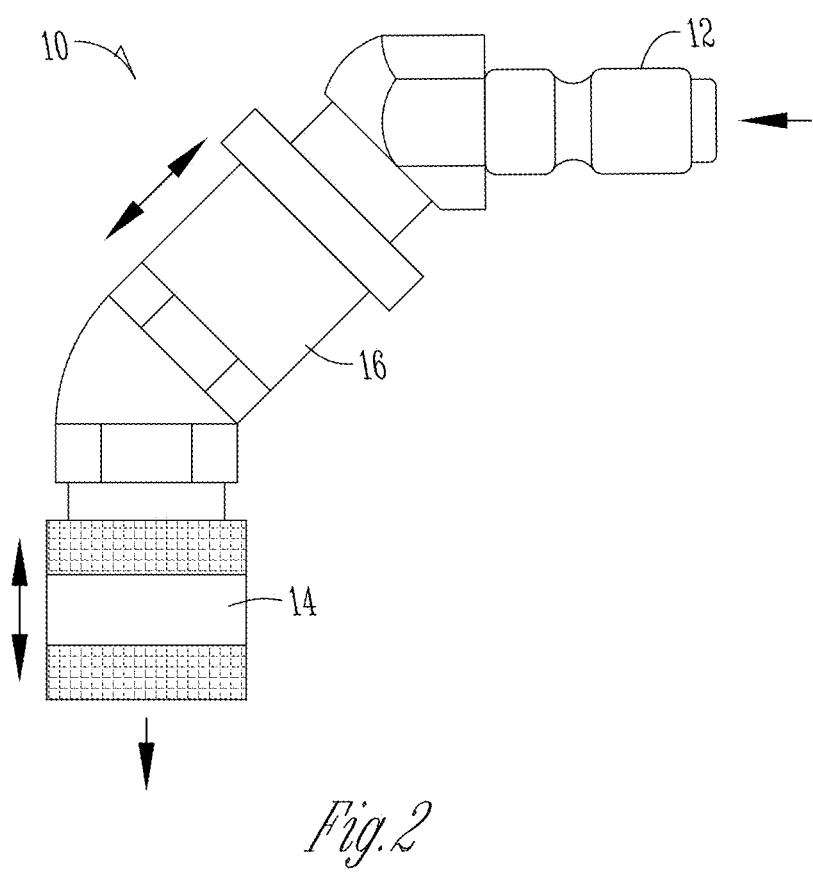
FIG. 2 is a side elevation view of the 360° swivel coupler for a pressure washer, according to the present invention, with the ends oriented for a spray line perpendicular to the pressure washer wand axis.

The 360° rotatable pressure washer coupler of the present invention is generally designated by the reference numeral 10 in the drawings. The coupler 10 includes a male quick connector 12 and a female quick connector 14 at opposite ends, as shown in FIG. 1. In an alternative embodiment shown in FIG. 1A, the quick connector 14 is replaced with an NPT threaded connector 14A. It is understood that the male connector 12 could alternatively have threads for connecting to the wand, gun or nozzle of the pressure washer. The connector 14, 14A and the connector 12 each extend at approximately 45° from the opposite ends of the body 16, as best seen in FIG. 1. The male and female connectors 12, 14 are known in the art. Female connector 14 is spring biased, detent type connector adapted to receive a male connector similar to male connector 12.

The male connector 12 is adapted to be connected to the wand, gun, or water hose of the pressure washer, while the female connector 14 or threaded NPT connector 14A is adapted to have a spray nozzle or tip mounted thereon.

Figure 3:
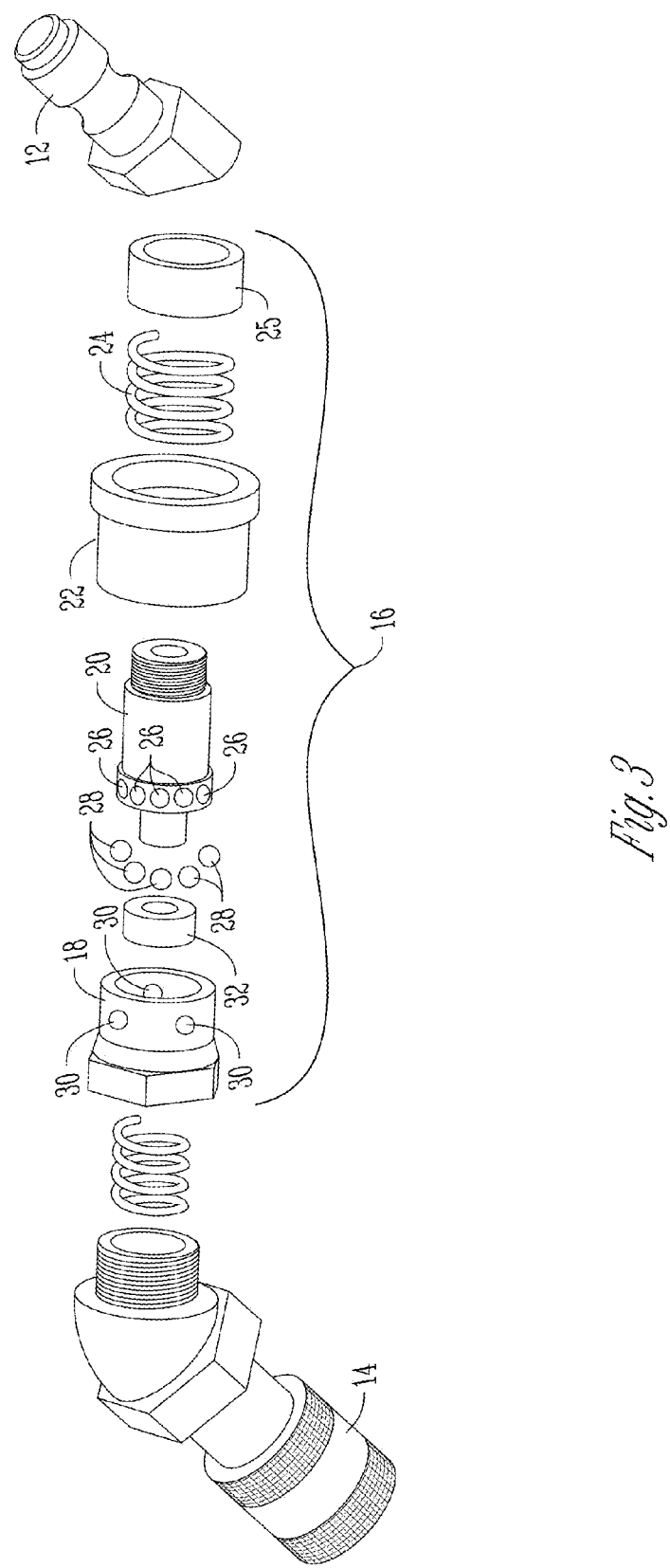
FIG. 3 is an exploded view of the coupler components.

The coupler 10 also includes a detent assembly or swivel connector 16 which allows the male and female connectors 12, 14/14A to rotate 360° relative to one another. More particularly, the detent assembly 16 includes a member 18 with internal threads to threadably mount on the external threads of the female connector 14, 14A, and a body 20 having external threads to threadably connect with internal threads on the male connector 12. A slidable sleeve 22 extends around the body 20 and is biased to a set or closed position by a spring 24. The body 20 of the swivel connector 16 includes a series of recesses 26 extending annularly around the piece. The recesses 26 are radially spaced at equal increments, preferably at 30°, 45° or 60° spacing. Detent balls 28 are received in each of the recesses 28 and in one or more holes 30 in the first member 18 of the swivel body 16, with a ring 32 residing within the member 18 to prevent the detent balls 28 from falling inwardly from the aperture 30. (FIG. 3 only shows 5 balls 28, but it is understood that there is one detent ball for each recess 26.) The diameter of the holes 30 is less than the diameter of the balls 28. The sleeve 22 covers the detent balls 28 and normally maintains the balls 28 in the recesses 26 when the sleeve 22 is in a first closed position. A tubular collar 25 extends over the body 20 and into the sleeve 22. The collar 25 provides guidance for sliding axial movement of the sleeve 22. The sleeve 22 can be pulled axially against the bias of the spring 24 to allow the detents 28 to unseat from the recesses 26 such that the body 20 can be rotated relative to the first member 18 and thereby rotate one of the connectors 12, 14/14A to a desired position. When the sleeve 22 is released, the spring 24 forces the sleeve back to the closed position to lock the male and female connectors 12, 14/14A at the selected position.

It is understood that the coupler 10 can be adjusted before or after the coupler is mounted to the pressure washer wand or hose and before or after the spray nozzle is attached to the coupler. Once the coupler 10 is mounted on the wand or hose, then the female connector 14/14A is rotatable relative to the male connector 12, with or without the spray nozzle.

The adjustable couple 10 allows the angle between the connectors 12, 14/14A to be selectively moved between a substantially parallel orientation and a substantially perpendicular orientation, and to several positions therebetween. Thus, the direction of spray from a nozzle mounted on the female connector 14 can be quickly and easily selected and set by a user of the pressure washer or other equipment utilizing the couple 10.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An adjustable coupler for a pressure washer having a wand and a spray nozzle, comprising:

a swivel body having opposite first and second ends and a longitudinal axis;

a male quick coupler rotatably mounted to the first end of the body and having an inlet axis;

a female quick coupler rotatably mounted on the second end of the body and having an outlet axis;

the male quick coupler being attachable to the wand without detaching the male quick coupler from the body;

the female quick coupler being attachable to the spray nozzle without detaching the female quick coupler from the body; and whereby the axis of one of the quick couplers is offset with respect to the body axis, and this one quick coupler being rotatable relative to the body so as to direct the spray nozzle in a desired direction; and the swivel body including a ball detent to lock the one quick coupler in a selected rotated position, the ball detent including a plurality of radially spaced recesses and at least one ball to selectively seat in one of the recesses.

2. The adjustable coupler of claim 1 wherein the one quick coupler is pivotal 360° relative to the body.

3. The adjustable coupler of claim 1 wherein the one quick coupler can be pivoted for straight and perpendicular spray directions.

4. The adjustable coupler of claim 1 wherein the detent assembly has a plurality of radially oriented detent positions for the one quick coupler.

5. The adjustable couple of claim 4 wherein the detent positions are spaced equal distance apart.

6. The adjustable coupler of claim 4 wherein the detent positions are spaced at 30°, 45° and 60° increments.

7. The adjustable coupler of claim 1 wherein the inlet axis and the outlet axis are each offset 45° from the body longitudinal axis.

\* \* \* \* \*